(12) United States Patent
Bose et al.

(10) Patent No.: US 11,269,338 B2
(45) Date of Patent: Mar. 8, 2022

(54) APPARATUS AND METHOD FOR WAREHOUSE ZONING

(71) Applicant: GREY ORANGE PTE. LTD., Singapore (SG)

(72) Inventors: Sagar Bose, Navi Mumbai (IN);
Naveen Boppana, Angaluru (IN);
Gaurav Kejriwal, Benares (IN);
Rupesh Agarwal, Jamshedpur (IN);
Akash Gupta, Railway Colony (IN);
Samay Kohli, New Delhi (IN);
Wolfgang Kurt Hoeltgen, Laatzen (DE)

(73) Assignee: GREY ORANGE PTE. LTD., Singapore (SG)

( * ) Notice: Subject to any disclaimer, the term of this patent is extended or adjusted under 35 U.S.C. 154(b) by 185 days.

(21) Appl. No.: 16/614,210

(22) PCT Filed: May 16, 2017

(86) PCT No.: PCT/IB2017/000583
§ 371 (c)(1),
(2) Date: Nov. 15, 2019

(87) PCT Pub. No.: WO2018/211295
PCT Pub. Date: Nov. 22, 2018

(65) Prior Publication Data
US 2020/0301432 A1 Sep. 24, 2020

(51) Int. Cl.
*G05D 1/02* (2020.01)
*G05D 1/00* (2006.01)
*G06Q 10/08* (2012.01)

(52) U.S. Cl.
CPC ......... *G05D 1/0214* (2013.01); *G05D 1/0027* (2013.01); *G06Q 10/087* (2013.01); *G05D 2201/0216* (2013.01)

(58) Field of Classification Search
CPC ............... G05D 1/0214; G05D 1/0027; G05D 2201/0216; G06Q 10/087
See application file for complete search history.

(56) References Cited

U.S. PATENT DOCUMENTS 8,648,709 B2  2/2014 Gauger et al.
9,202,374 B2  12/2015 Gauger et al.
(Continued)

FOREIGN PATENT DOCUMENTS

WO   WO 2016/009423 A1   1/2016

OTHER PUBLICATIONS

Extended European Search Report dated Nov. 3, 2020 in European Patent Application No. 179104141.6, 7 pages.
(Continued)

*Primary Examiner* — Ramsey Refai
(74) *Attorney, Agent, or Firm* — Oblon, McClelland, Maier & Neustadt, L.L.P.

(57) ABSTRACT

Described herein is an apparatus and a corresponding method for performing warehouse zoning and further monitoring the zoned warehouse. The apparatus includes circuitry that partitions a workspace into a plurality of zones based on an area of the workspace, and a number of transportation vehicles and a number of item racks that are to be deployed in the workspace. A location of each zone within the workspace is determined based on a location of a first type of station that is disposed outside the workspace. The apparatus determines for each zone, an area of the zone and receives a signal indicating occurrence of an event in one of the zones. Further, the apparatus determines a degree of criticality of the occurred event which indicates whether workspace operation in the zone can be continued, and initiates an operation at a timing that is based on the determined degree of criticality.

25 Claims, 6 Drawing Sheets

(56) References Cited

U.S. PATENT DOCUMENTS

| | | |
|---|---|---|
| 9,280,157 B2 | 3/2016 | Wurman et al. |
| 2014/0159888 A1 | 6/2014 | Gauger et al. |
| 2014/0178161 A1 | 6/2014 | Moosburger et al. |
| 2015/0066283 A1 | 3/2015 | Wurman et al. |
| 2015/0307278 A1* | 10/2015 | Wickham .............. G05B 15/02 700/216 |
| 2016/0229068 A1 | 8/2016 | Haman et al. |
| 2016/0271800 A1* | 9/2016 | Stubbs .................. B25J 9/1666 |
| 2017/0158430 A1 | 6/2017 | Raizer |

OTHER PUBLICATIONS

International Search Report and Written Opinion dated Aug. 18, 2017 in PCT/IB2017/000583 filed May 16, 2017.
First Substantive Report dated Aug. 16, 2021 in corresponding Chilean Patent Application No. 2019-3295 (with English translation)(12 pages).

* cited by examiner

APPARATUS AND METHOD FOR WAREHOUSE ZONING

FIELD

The present disclosure relates to an enhanced warehouse architecture, and a method thereof of monitoring activities in the warehouse.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Technological advancements have made an ever-increasing amount of automation possible in inventory-handling and other types of material-handling systems. Namely, inventory-handling systems (e.g., warehouses) may be implemented using automated mobile drive units that are assigned to inventory-related tasks. The level of human involvement with such automated systems has been greatly reduced, leading to increased speed, throughput, and productivity.

However, there may be circumstances where it is necessary for human operators to traverse, or otherwise go onto, an active workspace of the warehouse where the mobile drive units are carrying out their assigned inventory-related tasks. For example, mobile drive units or other equipment may fail or break down, or inventory items may fall out of their respective inventory holders onto the active workspace floor, requiring human operators to traverse the workspace to the location where the maintenance or cleanup is needed. However, traversing an active workspace of automated mobile drive units poses safety concerns for the human operators who traverse the active workspace. Moreover, traditional warehouses usually include a single open workspace floorplan, in which different functions of the warehouses are implemented. In such a warehouse, human operators and/or mobile drive units operate in unison. Accordingly, the occurrences of mishaps in the workspace could result in shutting down the warehouse.

Accordingly, the present disclosure provides for a customizable enhanced warehouse architecture, and a method of monitoring the activities in such a warehouse, such that the throughput of the warehouse is not degraded. In other words, the customizable enhanced warehouse minimizes the amount of unplanned downtime (i.e., maintains a continuity of operation) that may be incurred by the warehouse.

SUMMARY

An aspect of the present disclosure provides for an apparatus comprising: circuitry configured to partition a workspace into a plurality of zones based on an area of the workspace, and a number of inventory holders that are to be deployed in the workspace, a location of each zone within the workspace being determined based on a first reference location, determine for each zone of the plurality of zones, an area of the zone within the workspace, receive a signal indicating occurrence of an event in one of the plurality of zones of the workspace, determine a degree of criticality of the occurred event, the degree of criticality indicating whether workspace operation in the zone can be continued, and initiate an operation at a timing that is based on the determined degree of criticality, wherein initiation of the operation in the one of the plurality of zones does not affect workspace operation in at least one other zone of the workspace.

By one embodiment of the present disclosure is provided a method comprising: partitioning by circuitry, a workspace into a plurality of zones based on an area of the workspace, and a number of inventory holders that are to be deployed in the workspace, a location of each zone within the workspace being determined based on a first reference location; determining for each zone of the plurality of zones, an area of the zone within the workspace; receiving a signal indicating occurrence of an event in one of the plurality of zones of the workspace; determining a degree of criticality of the occurred event, the degree of criticality indicating whether workspace operation in the zone can be continued; and initiating an operation at a timing that is based on the determined degree of criticality, wherein initiation of the operation in the one of the plurality of zones does not affect workspace operation in at least one other zone of the workspace.

By one aspect of the present disclosure is provided a non-transitory computer readable medium having stored thereon a program that when executed by a computer causes the computer to execute a method comprising: partitioning a workspace into a plurality of zones based on an area of the workspace, and a number of inventory holders that are to be deployed in the workspace, a location of each zone within the workspace being determined based on a first reference location; determining for each zone of the plurality of zones, an area of the zone within the workspace; receiving a signal indicating occurrence of an event in one of the plurality of zones of the workspace; determining a degree of criticality of the occurred event, the degree of criticality indicating whether workspace operation in the zone can be continued; and initiating an operation at a timing that is based on the determined degree of criticality, wherein initiation of the operation in the one of the plurality of zones does not affect workspace operation in at least one other zone of the workspace.

The foregoing paragraphs have been provided by way of general introduction, and are not intended to limit the scope of the following claims. The described embodiments together, with further advantages, will be best understood by reference to the following detailed description taken in conjunction with the accompanying drawings.

BRIEF DESCRIPTION OF THE DRAWINGS

Various embodiments of the present disclosure that are provided as examples will be described in detail with reference to the following figures, wherein like numerals reference like elements, and wherein.

DETAILED DESCRIPTION

Exemplary embodiments are illustrated in the referenced figures of the drawings. It is intended that the embodiments and figures disclosed herein are to be considered illustrative rather than restrictive. No limitation on the scope of the technology and of the claims that follow is to be imputed to the examples shown in the drawings and discussed herein.

The embodiments are mainly described in terms of particular processes and systems provided in particular implementations. However, the processes and systems will operate effectively in other implementations. Phrases such as "an embodiment", "one embodiment" and "another embodiment" may refer to the same or different embodiments. The embodiments will be described with respect to methods and compositions having certain components. However, the methods and compositions may include more or less components than those shown, and variations in the arrangement and type of the components may be made without departing from the scope of the present disclosure.

The exemplary embodiments are described in the context of methods having certain steps. However, the methods and compositions operate effectively with additional steps and steps in different orders that are not inconsistent with the exemplary embodiments. Thus, the present disclosure is not intended to be limited to the embodiments shown, but is to be accorded the widest scope consistent with the principles and features described herein and as limited only by the appended claims.

Furthermore, where a range of values is provided, it is to be understood that each intervening value between an upper and lower limit of the range and any other stated or intervening value in that stated range is encompassed within the disclosure. Where the stated range includes upper and lower limits, ranges excluding either of those limits are also included. Unless expressly stated, the terms used herein are intended to have the plain and ordinary meaning as understood by those of ordinary skill in the art. The following definitions are intended to aid the reader in understanding the present disclosure, but are not intended to vary or otherwise limit the meaning of such terms unless specifically indicated.

Additionally, the terms 'transportation vehicle' or simply 'vehicle' can correspond to a automated transportation robot, and/or a human-operator controlled vehicle, that is used in warehouses, and the term 'warehouse server' corresponds to a server(s) that controls the operation of the vehicles, and controls and monitors the operations performed in the warehouse. These terms are used interchangeably in the remainder of the disclosure.

Figure 1:
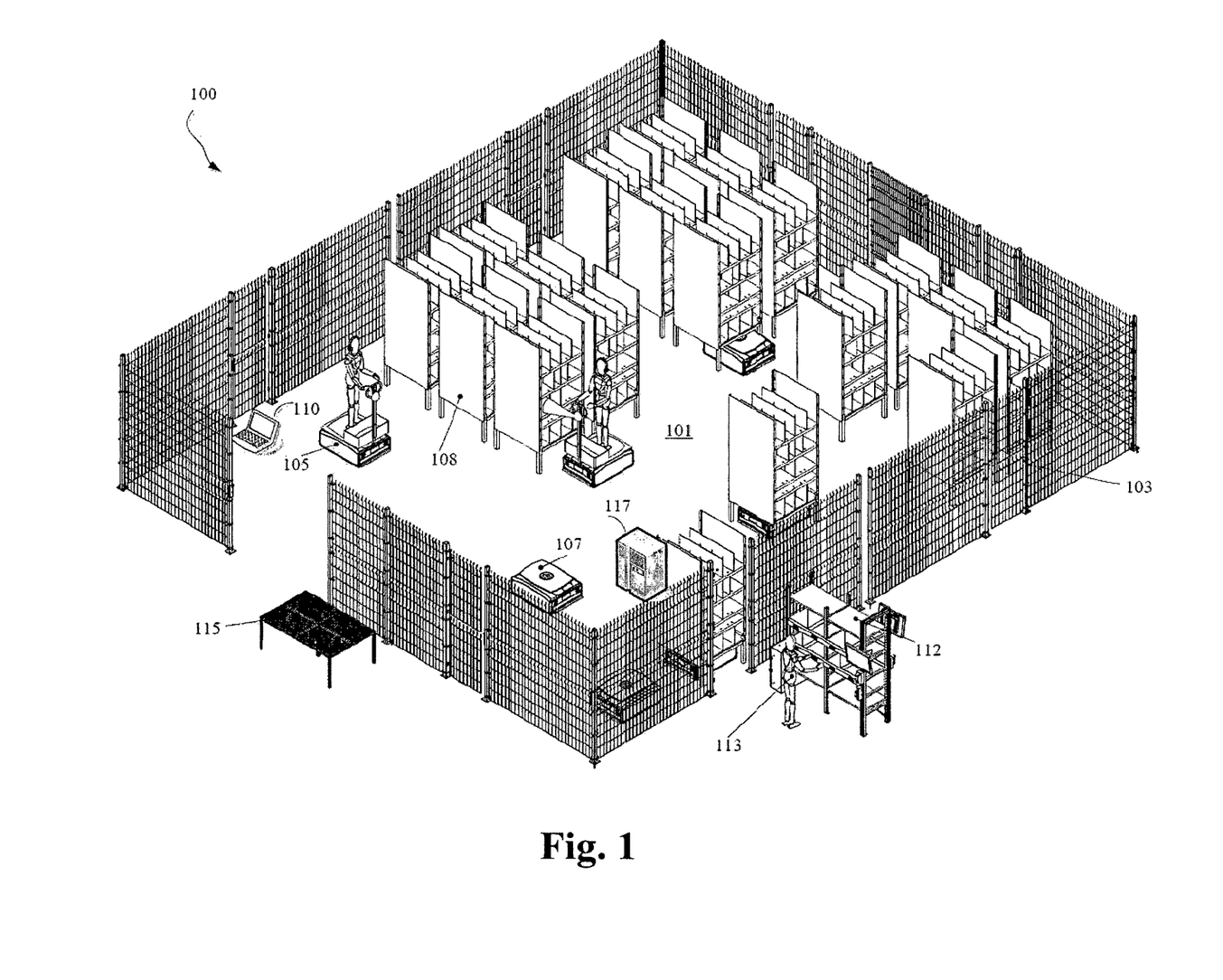
FIG. 1 illustrates an example warehouse system in accordance with an embodiment.

Turning to FIG. 1, there is illustrated an exemplary warehouse system 100 according to an embodiment. The warehouse system 100 may represent any type of inventory system or material-handling system for storing and processing inventory items. For instance, the warehouse system 100 may include, but is not limited to, a mail-order warehouse facility, a merchandise return facility, a manufacturing facility, or any other similar type of system.

The warehouse system 100 may include a workspace 101 that represents an area associated with the warehouse 100, where components typically operate and/or move about. For example, the workspace 101 may represent all or part of a floor of the warehouse. The warehouse may be surrounded by a fence 103, and include different types of transportation vehicles 105 and 107 that are configured to move within the workspace 101. Furthermore, the workspace 101 may include one or more inventory (e.g., goods or items) holders (referred to herein as racks) 108 that may be disposed in an allocated storage area within the workspace 101.

The workspace 101 may be of variable dimensions and/or arbitrary geometry, and in particular may represent a two-dimensional (2D) workspace (e.g., a floor) or a three-dimensional (3D) workspace. Furthermore, the workspace 101 may be entirely enclosed in a building, or alternatively, some or all of the workspace 101 may be located outdoors, or otherwise unconstrained by any fixed structure. In some embodiments, stairs, ramps, and/or conveyance equipment such as vertical or horizontal conveyors, escalators, elevators, and the like, may be included in the workspace 101 to allow components and/or users of the warehouse system 100 to access the various separate portions of the workspace 101.

The racks 108 may store one or more types of inventory items. The warehouse system 100 may be capable of moving these inventory items between locations within the workspace 101 to facilitate entry, processing, and/or removal of inventory items from the warehouse 100, and the completion of other tasks involving inventory items. The items from the racks may be transported from one location to another by means of transportation vehicles 105 and 107, respectively.

According to one embodiment, the warehouse 100 includes a warehouse server 110. The server 110 monitors the overall processing and operations of the warehouse system 100. For instance, the server 110 may be a server that controls the navigational functionality of the transportation devices 105 and 107, the monitoring of activities in the warehouse 101, and other tasks described herein. Furthermore, as described in PCT Application No. PCT/IB2016/000080, the warehouse system 100 may include a plurality of markers that are affixed on the warehouse floor, which enable the navigation of each transportation vehicle. Specifically, the server 110 communicates movement information to the transportation vehicles 105 and 107, to indicate the direction and a magnitude of distance the transportation vehicle is expected to take from a current marker (over which the vehicle is disposed) to another marker, which lies on the navigational path of the vehicle.

The warehouse system 100 further includes one or more inventory stations 112 where particular tasks involving inventory items can be completed by an operator 113. Additionally, the warehouse 100 may include dedicated stations 115, at which only certain types of vehicles are authorized to process items. Moreover, the warehouse system 100 may also include a charging station 117, where the transportation vehicles can be scheduled for charging batteries included in the vehicles.

In some instances, as shown in FIG. 1, having a single open workspace floor plan (i.e., workspace floor layout) may impose severe monitoring and maintenance responsibilities on the server 110. For instance, the server 110 may have to ensure collision avoidance between two transportation vehicles operating on the warehouse floor, the server may have to shut down the workspace floor on the occurrence of a critical emergency, and the like. In other words, the single workspace plan may lead to a chaotic system, which degrades the throughput of the warehouse, or in other words, increases the amount of non-operational time of the warehouse. Accordingly, with an aim to improve the monitoring and management of the warehouse system 100, there is a described a modified workspace architecture by one embodiment of the present disclosure. Moreover, it must be appreciated that the server 110 is not restricted in being disposed in the warehouse 100 as shown in FIG. 1. Rather, the server may be implemented in a cloud-like manner, and/or may be a remote server that installed in a different facility.

Figure 2:
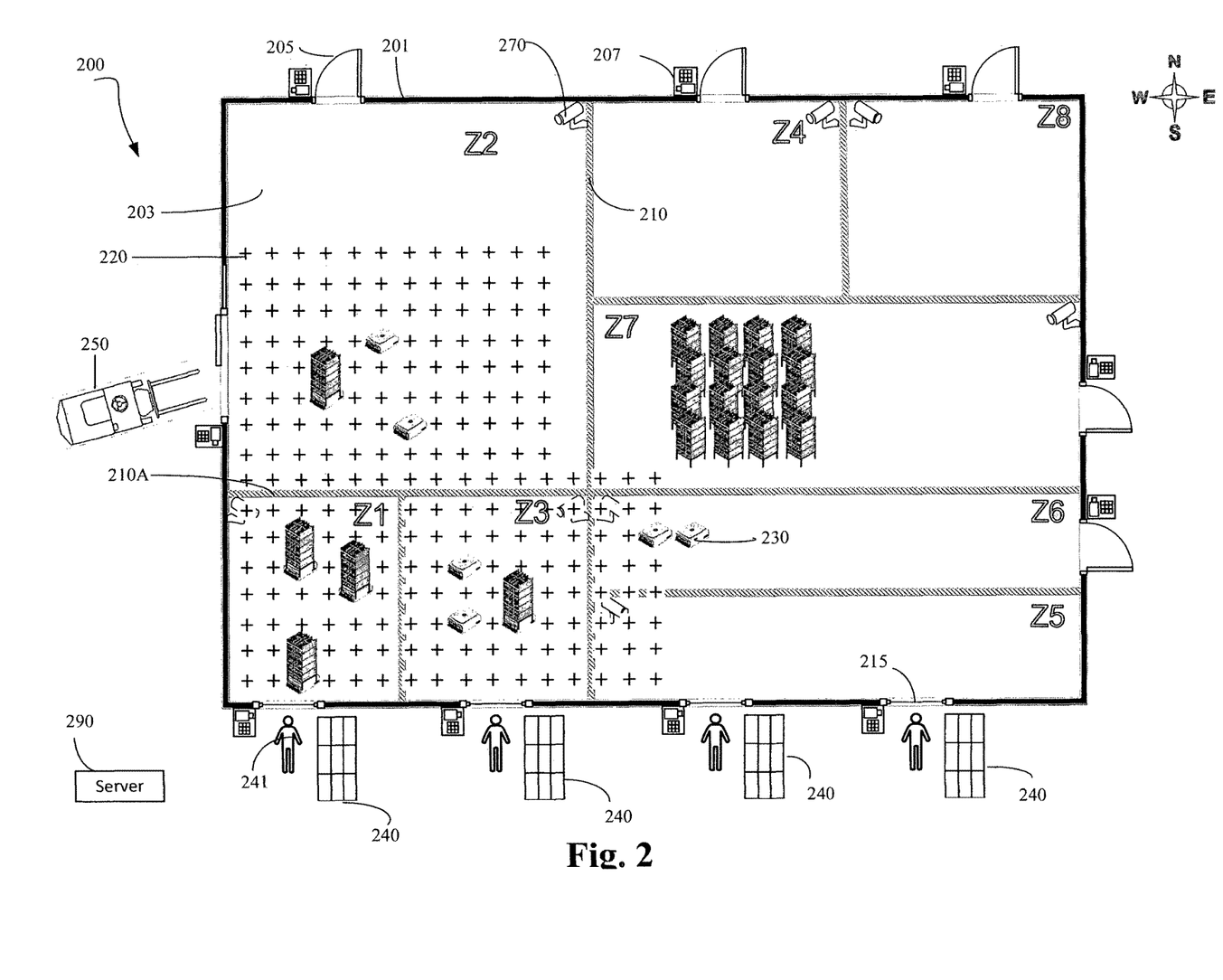
FIG. 2 illustrates by one embodiment, a zoned workspace architecture.

FIG. 2 depicts according to one embodiment, the modified architecture 200 of the warehouse workspace. The modified architecture 200 of the workspace is referred to herein as a zoned (i.e., partitioned) workspace architecture. Specifically, FIG. 2 depicts an area of the warehouse surrounded by a fence 201. The area of the workspace is divided into a plurality of partitions (also referred to herein as zones) 203. For instance, as shown in FIG. 2, the area of the workspace is divided into eight zones labelled z1-z8. The size and shape of each zone may be unique, and be determined by several criteria as described below. Furthermore, it must be appreciated that the number of zones in a particular workspace is in no way limited to eight zones as depicted in FIG. 2. Rather, by one embodiment, the number of zones in the workspace can be determined, for instance, based on the area of the workspace, number of racks (i.e., storage locations for items) in the warehouse, the different types of items processed by the warehouse, number of transportation vehicles in the warehouse, and the like.

As shown in FIG. 2, each zone 203 may be separated from its adjacent zones by means of physical markers 210 that are deployed on the floor of the workspace. For example, the physical markers 210 may be industrial type heavy-duty tape that provides a visual indication to human operators in the workspace as to the boundaries of a particular zone 203.

According to one embodiment, the size and location of each zone 203 within the warehouse may be determined based on the type of racks that are stored in the zone. For instance, a zone housing popular racks (i.e., racks that store popular items) may be assigned a larger area. Popular items correspond to the items that are frequently serviced (e.g., included in several orders) by the warehouse. Accordingly, assigning such a zone a larger area would allow for multiple transportation vehicles to operate in the zone simultaneously. Moreover, the location of such a zone may be assigned close to a processing station 240. The processing station 240 is a designated location in the warehouse where orders are processed. For instance, as shown in FIG. 2, popular racks may be assigned to zones z1 and z3, which are located close to the processing stations 240 where the orders are processed. Furthermore, based on the number of racks that are to be deployed in such zones, the zones may be assigned a larger floor area as compared to other zones. It must be appreciated that the locations of the processing stations 240 are not restricted to be located at one edge of warehouse floor as shown in FIG. 2. Rather, the processing stations 240 may be disposed at any location around the periphery of the warehouse.

By one embodiment, the location of a zone may be determined by the type of equipment housed in the zone. For instance, the charging station 117 (of FIG. 1), may be assigned to a zone which is located away from the busy areas (e.g., processing stations 240) of the warehouse. Accordingly, the transportation vehicles 230 can be scheduled for charging batteries included in the vehicles, without disrupting the operations of the busy areas of the warehouse.

Further, by one embodiment, certain racks may be required to be stored in areas of the warehouse that are maintained at some predetermined temperature. Accordingly, such racks may be allocated to a zone of the warehouse which is away, for instance, from the zone which houses the charging station, as the charging station may dissipate large amounts of heat. Such a temperature maintained zone may be allocated at a corner of the warehouse.

According to one embodiment, the location of zones within the partitioned workspace may be determined by external factors. For instance, region 200 as depicted in FIG. 2 may be a portion of a larger area of the warehouse. In such a setting, there may be a requirement to transport certain equipment (e.g., a forklift 250) through the workspace 200. For example, the forklift 250 may be required to deliver certain items from one area of the workspace to another, obtain the processed orders from the processing stations 240, and deliver the orders to a dispatch area of the warehouse, and the like. For example, the forklift 250 may transfer the processed items from the processing station 240 (located outside zone 3), and transfer the processed items to the dispatch area, which may be located in a direction substantially north of the workspace 200. In such a situation, it may be desired to transfer the forklift 250 by traversing multiple zones of the workspace 200.

By one embodiment, while the forklift 250 traverses the zones of the workspace 200, other operations in the zones may have to be temporarily ceased. Accordingly, it may be desired to assign the forklift to traverse through zones which are less frequently used. For example, referring to FIG. 2, the forklift can traverse either through zones z3 and z2 (and eventually exit through the gate 205 of zone z2) to reach the dispatch area, or the forklift can traverse through zones z5, z6, z7 and z4 or z8, to reach the dispatch area. The server determines a route for the forklift 250 by computing an average amount of traffic (e.g., transportation vehicles 230), that is operational in each of the zones at the time instant the forklift 250 requires to be transported, and selects an option which results in a minimum cumulative amount of zone downtime that would be incurred. In other words, at time instances when the zones are idle, the zones may be assigned to provision for the passage of the forklift. Accordingly, the throughput of the warehouse is affected minimally. Accordingly, by one embodiment, the location and assignment of zones in the workspace may be determined by an average amount of expected traffic (i.e., of transportation vehicles) that is to be operational in the zones.

By one embodiment, at least one zone 203 of the workspace 200 includes a plurality of navigational markers 220. As stated previously, such markers enable the navigation of each transportation vehicle 230. Specifically, the server 290 communicates movement information to the transportation vehicle 230 to indicate the direction and distance of movement to take from a current marker 220 over which the vehicle 230 is disposed to a next marker, which lies on the navigational path of the vehicle. The markers 220 may be a machine readable pattern, such as a barcode or a quick response (QR) code.

Additionally, each zone 203 of the workspace 200 may include a gate 205. In one embodiment, the gate 205 serves as the only entry/exit point for transportation vehicles, operators etc. through the zone 203. Further, the gate 205 may be equipped with a safety device such as a door-latch sensor that is configured to detect at least the closing/opening operation of the door, movement of traffic through the door and the like, and report the same to the server 290.

By one embodiment, each zone 203 is also equipped with a light indicator device 207. The light indicator device 207 is configured to display a plurality of colors, wherein each color corresponds to an operational state of the zone. For instance, a green color may indicate a normal operational state of the zone, a yellow color may indicate a certain function being executed in the zone, whereas a flashing red light may indicate an emergency operational state of the zone. The colors displayed by the light indicator device 207 are controlled by the server 290, and serve as an indication, for instance, to personnel 241 working on the warehouse floor. For example, a red-flashing light may indicate to an operator, that he/she is not to enter the particular zone until the emergency is resolved. Furthermore, each zone 203 may be equipped with a camera (e.g., a CCTV camera or the like) which provides a real-time video of the zone environment to be displayed on a display panel of the server 290 (described later with reference to FIG. 3).

Additionally, each zone 203 of the workspace 200 may also include a light-curtain device 215. By one embodiment, the light-curtain device 215 is a sensing device which includes a transmitter-receiver pair that is configured to detect movement of objects. By one embodiment, the light-sensing device may be an opto-electronic presence sensing safety device that detects the presence of an object in the light curtain's sensing field. A detected movement of objects through the sensing field may be reported by the respective light-sensing device 215 to the server 290. Additionally, the light-curtain device 215 may also be used in conjunction with the physical markers 210 (zone-division markers) to detect the crossing of operators from one zone to another. Such crossing over of an operator may be reported to the server 290.

By one embodiment, a plurality of light curtain devices may be installed along the length of the physical markers 210 that are deployed on the floor of the workspace. Accordingly, the plurality of light curtain devices may detect the crossing of a personnel (i.e., operator) 241 and/or transportation vehicles 230 from one zone to another zone, and report the crossing to the server.

The plurality of light curtain devices may also detect the crossing of transportation vehicles from one zone to another. However, in some instances, a transportation vehicle may be allowed to cross over from one zone to another zone based on a number of active transportation vehicles in the another zone being less than a predetermined threshold number of vehicles. In a similar manner, there may be an instance of a human operator working in a first zone, and a transportation vehicle operating in an adjacent zone (i.e., a second zone). In the event that there is a mechanical failure (i.e., breakdown) in the transportation vehicle, warehouse personnel is scheduled to perform maintenance type operations on the transportation vehicle. In such a case, the human operator in the first zone may be allowed to crossover into the second zone, provided that there are no other active transportation vehicles in the second zone.

Accordingly, by one embodiment of the present disclosure, the warehouse 200 may operate in one of two modes: a first mode of operation, and a second mode of operation. In the first mode of operation, transportation vehicles as well as personnel are prohibited from crossing over the physical markers to enter adjacent zones. Thus, in this mode of operation, the transportation vehicles and operators are constrained on entering/exiting a particular zone only through the corresponding gate of the zone. In contrast, in a second mode of operation, transportation vehicles, forklifts, and/or personnel may be granted permission to cross over the physical markers to enter adjacent zones. Additionally, it must be appreciated that a first subset of zones may be configured by the server 290 to operate in the first mode of operation, and a second subset of zones may be configured to operate in the second mode of operation. In such a scenario, the operational mode of a subset of zones may be determined based on an average amount of traffic present in the zones, and/or traffic thresholds as described previously.

It must be appreciated that the server 290 as depicted in FIG. 2 may also be configured to perform the partitions (and further monitor the partitions) of the warehouse as described above. Moreover, the server may include one or more servers working in conjunction with one or more databases. Furthermore, it must be appreciated that the servers described herein are not limited to any specific combination or hardware circuitry and/or software. The server 290, in one embodiment, includes circuitry (described later with reference to FIG. 6) that is configured to perform the functions described herein. Moreover, the zones of the warehouse may be discontinuous and/or located on different levels (i.e., different floors) of the warehouse.

By one embodiment of the present disclosure, the server 290 is configured to create a zoned architecture of the warehouse based on customer demands as well as external factors as stated previously. Upon creating the zoned architecture, the server monitors each zone and detects the occurrence of several events as described below. The server performs functions (e.g., control functions, maintenance functions, and the like) on each zone with an aim to minimize the degradation in the throughput of the warehouse.

In what follows, there is provided a detailed description of the various functions (and the corresponding events that trigger the functions) performed by the server on each zone of the warehouse. It must be appreciated that the server is in no manner restricted to perform only the functions described below. Rather, the server can be configured to perform functions analogous to the ones described below.

As stated previously, each zone in the warehouse may include a plurality of navigational markers 220 (FIG. 2) affixed on the floor of the warehouse. The server provides navigational instructions to the transportation vehicles. Upon receiving information corresponding to a marker over which the transportation vehicle is currently disposed over, the server provides navigational information to direct the transportation vehicle to the next marker. By one embodiment, the transportation vehicles of the warehouse are equipped with sensors, and circuitry that is configured to maneuver the transportation vehicle in the warehouse. For instance, the sensors on the transportation vehicle can be configured to detect the markers on the floor, and the circuitry may be configured to transmit an acknowledgement signal to the server, to notify the receipt of navigational instructions.

In some cases, there may be a possibility of an erroneous detection of the marker by the transportation vehicle. For instance, if there is debris (e.g., dust accumulation) on the markers, the transportation vehicle may not correctly detect the marker. Such an erroneous detection may result in either the server transmitting inaccurate navigational instructions to the vehicle and/or the transportation vehicle coming to a standstill, as it does not receive any navigational instructions from the server. Moreover, there may be a possibility that the transportation vehicle may not transmit the acknowledgement signals to the server due to malfunction in the circuitry of the vehicle.

Further, by one embodiment, the transportation vehicle may detect the presence of an obstacle in its path. The detection of such an obstacle is notified to the server, whereafter the server may be configured to initiate an emergency function in order to resolve the occurrence of the event. For example, the server may schedule a human operator to the zone to remove the obstacle (e.g., a displaced item) from the warehouse floor. In a similar manner, the transportation vehicle may detect for instance, a water spillage on the floor of the warehouse. Such an event may be detected by the transportation vehicle via accelerometer sensors. It must be appreciated that the occurrence of the water spillage may result in deviation (due to wheel slip) of the transportation vehicle. Accordingly, the transportation vehicle may detect the navigational-markers in an inaccurate fashion. As such, the vehicle may be offset from its predetermined path.

By one embodiment, the server may be configured to determine a criticality of such events. For instance, the server may compare a detected offset in the transportation vehicle to a predetermined threshold. Upon the detected offset being greater the predetermined threshold (signifying that the vehicle is substantially deviated from its intended path), a first type of function may be initiated to resolve the event. The first function may be a 'zone-stop' function, wherein all the transportation vehicles in the zone (i.e., the zone where the event has occurred) are instructed to come to an immediate stop.

In contrast, if the detected offset of transportation vehicle is lesser than the predetermined threshold, a second type of function may be initiated by the server. For instance, the second function may be a 'zone-pause' function, wherein the server may instruct the transportation vehicles to come to a halt at the next marker in its transportation path. By one embodiment, if the detected offset is lower than a fixed percentage of the threshold (e.g., less than 50% of the threshold), the server may instruct the transportation vehicles to continue normal operation.

It must be appreciated that the initiation of the first type of function and the second type of function results in deactivation of the transportation vehicles in the zone, and thereby degrade the throughput of the system. Upon deactivating the transportation vehicles, the server may instruct a human operator to perform maintenance functions. The human operator may perform, for instance, a cleaning of the navigational markers in the zone.

By one embodiment, the server may be configured to detect the occurrence of the above described events in all zones of the warehouse. Based on the simultaneous occurrence of such events in a number of zones being above a predetermined threshold number of zones (e.g., more than 50% of the zones), the server may be configured to initiate a warehouse stop function, wherein all the transportation vehicles in the warehouse are deactivated, and a cleaning operation (e.g., marker clean up) may be initiated.

Additionally, the server may be configured to detect the presence of an unauthorized personnel in a given zone. For instance, by one embodiment, certain zones in the warehouse may be deemed as a 'personnel-free' zone. Accordingly, the server may be configured to detect via the light-curtain devices, the door-latch sensors, or camera the presence of personnel in such zones. Upon detection, the server may be configured to either perform a zone-pause or a zone-stop operation of the corresponding zone in which the personnel was detected.

By one embodiment, the server may receive an interrupt signal, for instance, from an operator of a forklift device. As stated previously, the forklift may be used to transport certain items from one location in the warehouse to another location in the warehouse. Such a transportation of the forklift may require the server to cease operations in multiple zones through which the forklift is expected to traverse.

Accordingly, by one embodiment, the server may be configured to determine an amount of down-time of the zones (defined herein as the amount of time where no operations are performed in the respective zones) that would be incurred in order to accommodate the transportation of the forklift. Further, the server may also be configured to determine whether, at the current time-instant, the transportation vehicles in the requested zones are performing a time-critical task such as high demand order processing. Further, based on the amount of down-time exceeding the time-criticality of the tasks, the server may be configured to defer the allocation of zones for the passage of the forklift at a later time instant.

As an example, consider the case where the server receives a request at 10:30 a.m. to cease the operations of zones 1 and 2 for ten minutes, in order to transport the forklift. If the server determines (at time instant 10:30 a.m.) that the transportation vehicles in at least one of zones 1 and 2 are performing tasks, for instance, which need to be completed by 10:35 a.m., the server may deny the request of allocating zones 1 and 2 for the passage of the forklift, and subsequently defer the allocation at a later time instant. Accordingly, the server prevents the degradation of throughput of the warehouse system.

By one embodiment, the server may compute a number of active transportation vehicles in the requested zone(s), upon receiving the external interrupt signal. Further, if the number of active transportation vehicles is less than a predetermined threshold, the server may grant permission to the forklift to traverse the requested zone(s). However, if the number of active transportation vehicles is greater than the threshold, the server may defer the allocation of the requested zone(s) to the forklift for its traversal, and/or alternatively compute a route for the forklift through other zone(s) in a manner such that the throughput of the warehouse is not degraded (e.g., allocate zone(s) to the forklift where no transportation vehicles are in operation).

With regard to the event of detecting an obstacle on the warehouse floor, the server may be configured to determine a criticality of the event, by determining whether the obstacle (e.g., displaced item) lies in a navigational path of an active vehicle, or is displaced in a portion of the zone which is not being used by the active vehicles. Accordingly, in the first case, the server may perform a zone-stop or zone-pause function, and schedule a personnel to remove the displaced item from the floor. However, in the second case (where the obstacle does not lie in the navigational path of the vehicles), the server may provision for the transportation vehicles to complete their assigned tasks, and further schedule the personnel to remove the obstacle at a later point of time.

Figure 3:
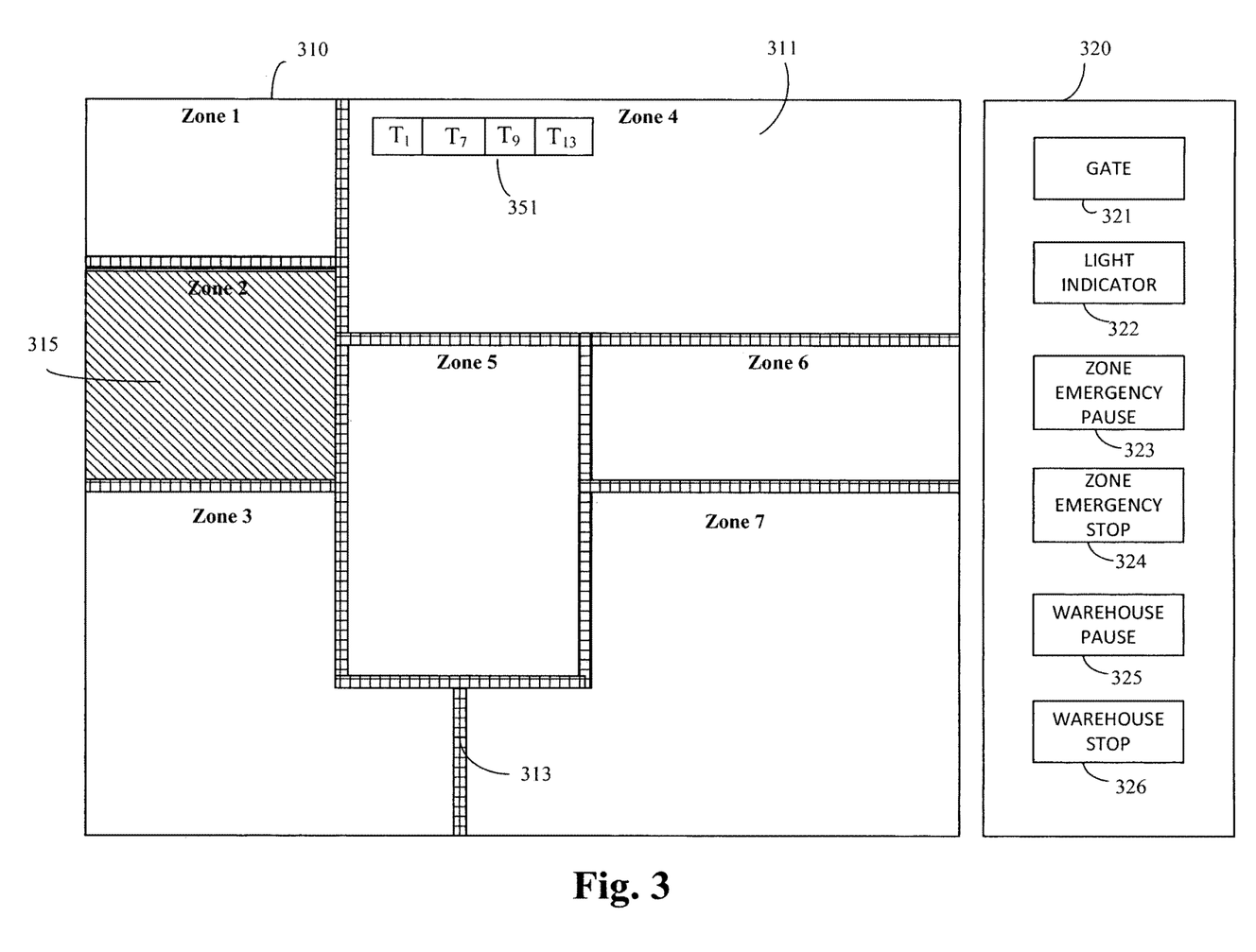
FIG. 3 illustrates an exemplary display panel of a warehouse server.

According to an aspect of the present disclosure, the server is configured to display the zoned architecture of the warehouse on a display panel. FIG. 3 illustrates exemplary information displayed on the panel. As shown in FIG. 3, the display includes a map portion 310 and a control portion 320.

The display can be a touch panel that can detect a touch operation on the surface of the display. For example the touch panel can detect a touch operation performed by an instruction object such as a finger or stylus. Touch operations may correspond to user inputs such as a selection of an icon or a character string displayed on the display. The touch panel may be an electrostatic capacitance type device, a resistive type touch panel device, or other such type devices for detecting a touch on a display panel. Moreover, the display can be a liquid crystal display (LCD) panel, an organic electroluminescent (OLED) display panel, a plasma display panel, or the like. The display panel may display text, an image, a web page, a video, or the like. By one embodiment, the display can be remotely connected to the server.

As shown in FIG. 3, by one embodiment, the map portion 310 includes a pictorial representation illustrating the partitions 311 (i.e., zones) of the warehouse. For example, the map portion 310 depicted in FIG. 3 includes a total of seven zones, wherein of which is demarcated by physical markers 313 and/or the boundary (fence of the warehouse). The control portion 320 includes a plurality of buttons 321-326 that can be used to perform control operations in different zones of the warehouse. Accordingly, the display provides a visual indication as well as a control mechanism for an operator to control the above described functions being operated in the zones of the warehouse. A selection performed by the server operator can be detected and processed by the touch panel and further transmitted to processing circuitry (described later with reference to FIG. 6) of the server.

By one embodiment, in situations such as when the server receives a signal from a transportation vehicle from a zone, notifying for instance, detection of an obstacle, detection of water spillage and the like, the server may be configured to highlight and/or perform a blinking operation on the corresponding zone 315 on the display panel. Thus, the operator is made aware of the location of disruption in the warehouse, and can further perform a touch operation to select the particular zone.

Upon selection of the particular zone, the operator may be presented with an additional display 351, listing the current transportation vehicles that are assigned to the selected zone. In a manner, similar to the highlighting of the zone, upon displaying the list of active transportation vehicles, the icon corresponding to the transportation vehicle which transmitted the signal to the server may be configured to blink. As such, the operator can select the particular transportation vehicle, whereafter the server may receive (from a camera installed on the transportation vehicle) and display a live stream of the neighborhood of the transportation vehicle. Thus, the server provides a visual depiction of any mishaps occurring on the warehouse floor to the server operator.

The control portion 320 includes a plurality of buttons 321-326 that can be used to perform control operations in different zones of the warehouse. For instance, by one embodiment, the server operator can select a particular zone by performing a touch operation on the map portion 310 of the display. Further, control operations in the selected zone can be performed by performing a subsequent touch operation on the buttons 321-326 of the control portion 320 of the display. Moreover, it must be appreciated that the server may be configured to indicate to an operator, the occurrence of an obstacle being detected, and the like events, via an auditory message. Additionally, the server may also be configured to communicate with a printer device, to perform a printing operation, for instance, printing of images of affected region of the zone and the like.

By one embodiment, a gate button 321 may be operable to open/close a gate of the selected zone. Moreover, upon unauthorized entry of a personnel in a particular zone, the gate button may be configured to blink after performing the blinking operation on the zone in the display portion 310.

A light indicator button 322 may be configured to display a specific color on the light indicator device 207 (FIG. 2) corresponding to a particular zone. Moreover, the control portion 320 also includes icons for performing (by an operator of the server) the zone-pause 323, zone-stop 324, warehouse-pause 325, and warehouse-stop 326 functionalities (as described previously) by performing a corresponding touch operation on the icons.

Figure 4:
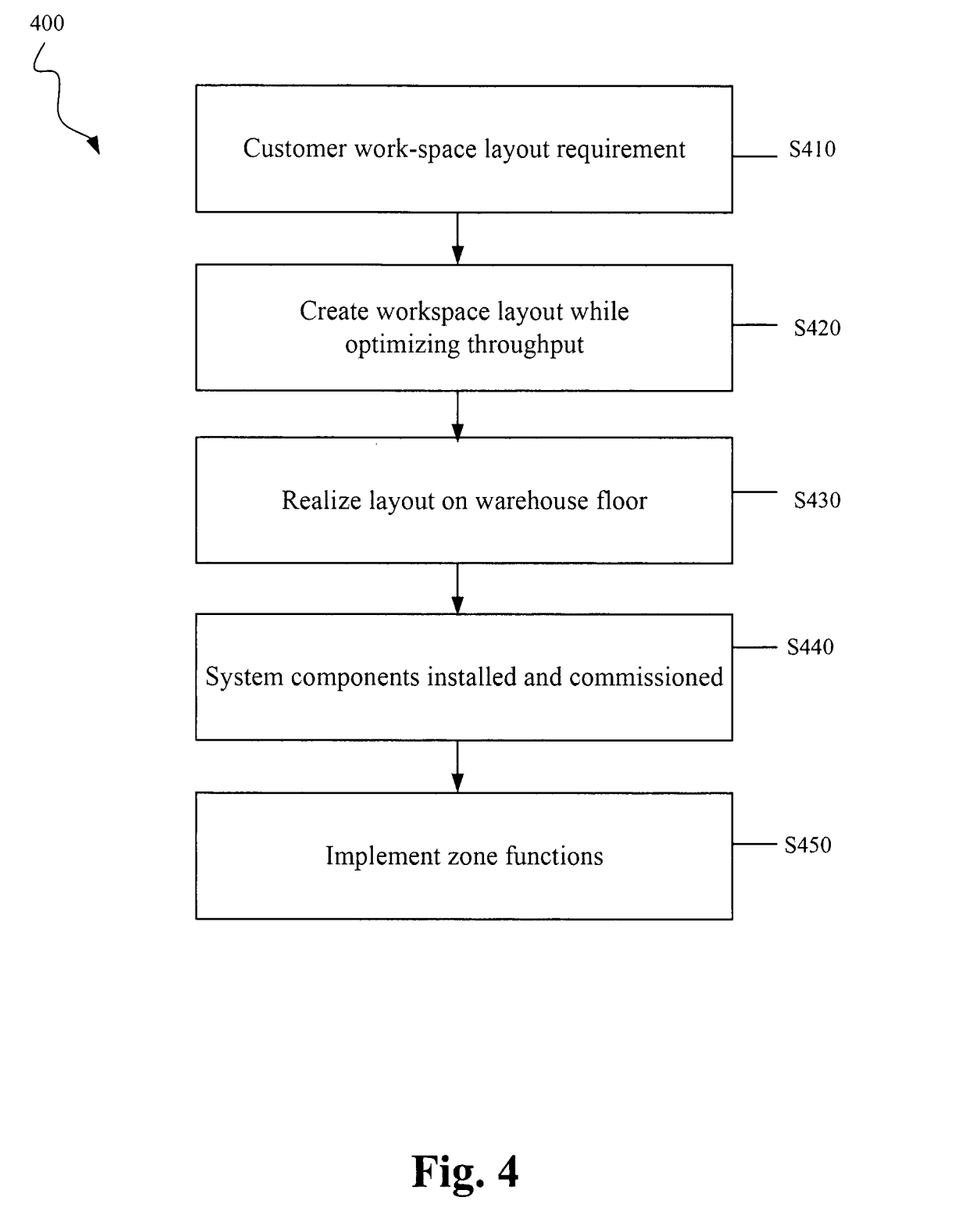
FIG. 4 illustrates according to an embodiment, a flowchart depicting the steps performed in creating a zoned architecture of the warehouse.

Turning to FIG. 4, there is illustrated according to an embodiment, a flowchart 400 depicting the steps performed in creating a zoned architecture of the warehouse. By one embodiment, the server 290 of the warehouse system may be configured to compute a location, size, number of zones to install and the like.

The process commences in step S410, where customer requirements for the workspace layout are input to the server. For instance, the location and size of the zone may depend on the number of storage racks that are to be deployed, the type of items stored in the storage (i.e., popular items, non-popular items etc), the location of processing stations, and other criteria as described previously.

In step S420, the server creates a zoned architecture based on the input requirements. By one embodiment, the serve may first determine the number of zones to be created, and further determine the location and area of each zone by considering in a sequential manner, the input criteria. For example, the criteria of having popular racks in a zone which is located close to the processing stations may be assigned a highest priority, and thereby the locations of such zone may be determined first. Note that the area of such zones is determined for instance, based on the number of storage racks that are housed in the zones, an average number of transportation vehicles that are expected to traverse the zones, and the like criteria.

Further, the process proceeds to step S430 wherein the created zoned architecture of the warehouse is implemented on the warehouse floor. In this step, for instance, the physical markers that divide the zones, the navigational markers that enable vehicle navigation and the like are installed on the warehouse floor.

The process in step S450 includes the deployment of other devices such as a gate, light-curtain devices, cameras, sensors, and the like. Upon installing the other devices the server may also perform a test to ensure that all devices are operating in an acceptable manner.

Upon creating the zones and installing the above stated devices in the zones of the warehouse, the process of zone creation is completed, whereafter the server is ready for performing zone monitoring functions.

Figure 5:
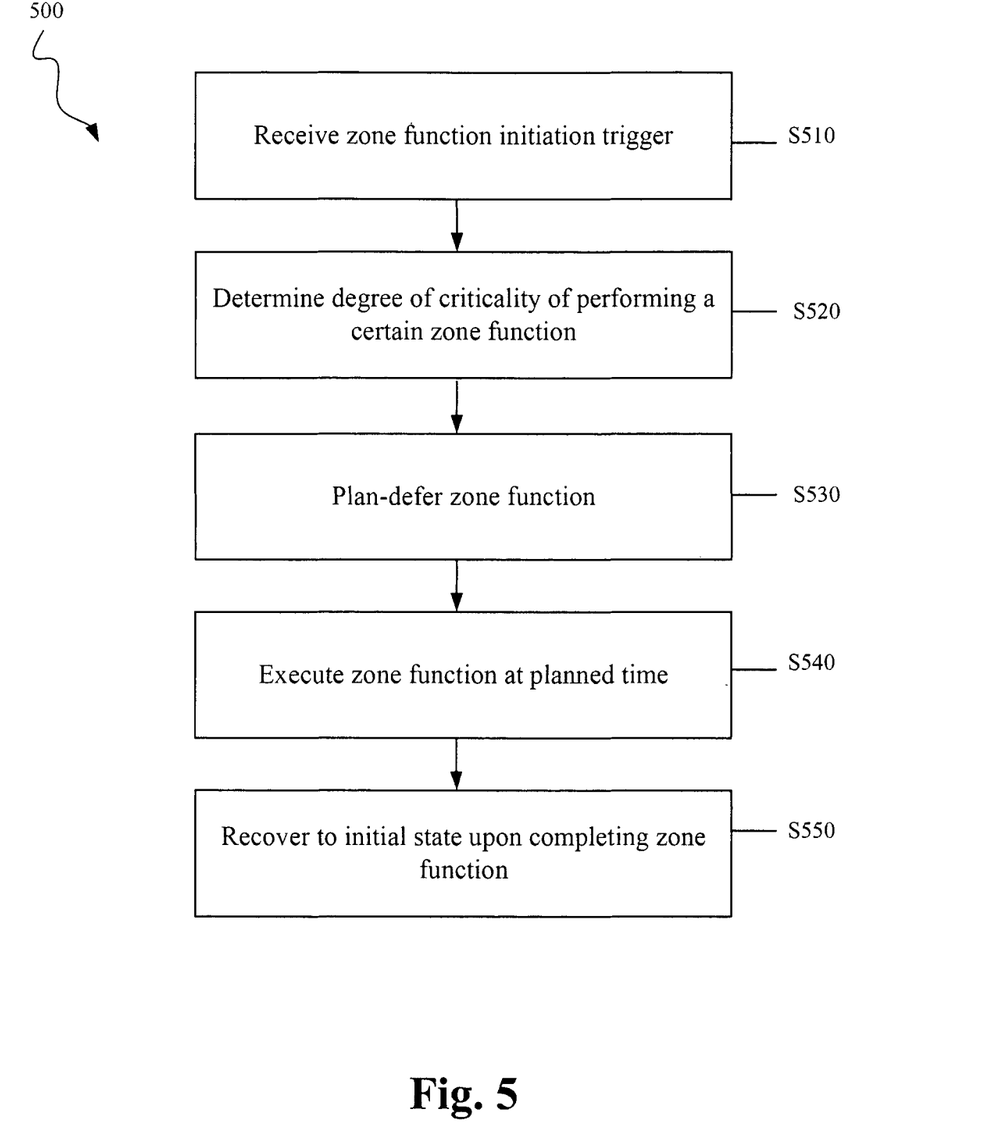
FIG. 5 illustrates according to an embodiment, a flowchart depicting the steps performed in executing zone functions.

Turning to FIG. 5, there is illustrated according to an embodiment, a flowchart 500 depicting the steps performed in executing zone functions.

The process begins in step S510, wherein the server of the warehouse receives a signal indicating that a certain function is to be implemented in a particular zone. As stated previously, the signal may originate for instance, from a transportation vehicle in a zone that has detected a displaced object on the floor of the warehouse, a vehicle that has detected water spillage on the floor, or similar mishaps that may be detected by a transportation vehicle. Additionally, the server may receive a zone function initiation trigger signal from an external source, such as an operator of a forklift, who desires to traverse through certain zones of the warehouse to deliver goods.

In step S520, the server determines a criticality of initiating the zone function. As stated previously, in the case of a vehicle being offset from the navigational markers, the server may compare a detected offset in the transportation vehicle to a predetermined threshold, and determine whether one of a zone-stop and zone-pause function is to be initiated immediately or whether the function can be scheduled at a later time instant. As another example, in the case of detecting a water spillage on the floor of the warehouse, or a misplaced item lying on the floor of the warehouse, the server may determine whether one of a zone-stop and zone-pause function is to be initiated, while taking into account a safety factor based on the function being deferred. For example, if the function of zone-pause or zone-stop is to be initiated upon detecting a misplaced item, the server may determine that the item does not lie in the navigational path of any current active transportation vehicle(s) that is/are operating in the zone. Thus, by one embodiment, the server may defer the clearing of the misplaced item (to prevent a degradation in throughput of the warehouse) to be scheduled at a later time instant by scheduling, for instance, a personnel to clear the item. However, while determining the time instant as to when the personnel is to be scheduled to clear the misplaced item, the server by one embodiment, may also determine a safety factor (e.g., determine whether the misplaced item poses any imminent problems).

In step S530, the server determines based on the above described criteria, whether the zone function is to be implemented immediately or whether the zone function can be deferred to a latter time instant.

In step S540, the server implements the required function by initiating, for instance, a zone-pause or zone-stop function. Upon completing the appropriate zone function at the determined time instant, the process in step S550 reverts state of the zone to its initial operational state (i.e., a zone clear state).

It must be appreciated that the means of demarcating the boundaries of the zones is not limited to using physical markers as stated previously. Rather, the boundaries of the partitioned zones may be demarcated by using laser. By one embodiment of the present disclosure, the usage of lasers to demarcate the boundaries of the zones, allows for adjusting the boundaries of a zone in a dynamic fashion. Specifically, the server may be configured to dynamically change the area of a particular zone by manipulating the boundary of the zone, and/or combine (i.e., morph) two or more zones into one zone as described below. For example, referring to FIG. 2, consider the scenario where zones z1 and z3 experience heavy transportation vehicle traffic, (such a situation may occur at peak times of the warehouse operation), and zone z2 experiences substantially less traffic. In such a scenario, the server may be configured to adjust (i.e., reconfigure) the zone boundaries of zones z1 and z2. For example, the server may reconfigure the zone boundary labeled 210A (i.e., the boundary that separates zones z1 and z3 from zone z2) by moving the zone boundary vertically upwards. Doing so would provide more space for additional transportation vehicles to operate in zones z1 and z3, and thereby increase the throughput of the warehouse. Furthermore, by one embodiment of the present disclosure, the server may be configured to determine transportation vehicles in other zones which are idle (i.e., the transportation vehicles that are not performing a task), and assign such transportation vehicles to perform the tasks in zones z1 and z3 (i.e., busy zones). In this manner, the server increases the throughput of the warehouse.

According to one embodiment, the server may be configured to perform failure prediction analysis in the warehouse. Specifically, the server may be configured to predict an occurrence of failure in a particular zone of the warehouse. As stated previously, the server enables navigation of the transportation vehicles in the zones of the warehouse, by providing navigational instructions (from a current marker to a next marker) to the transportation vehicles on a hop-by-hop basis.

In some cases, dust/debris may accumulate over the markers. Furthermore, the markers may incur wear and tear over a period of time. In such cases, the transportation vehicle may inaccurately detect the marker and/or incur an increasing amount of time that is required to decode the marker. The server may maintain a record (in a database) of an amount of time required (by the transportation vehicle) to decode each marker.

Furthermore, the sever may monitor (in real time) the amount of time required by various transportation vehicles to decode a particular marker. The server may be configured to compare, for instance, an average amount of time required by the transportation vehicles to decode the particular marker, and compare the average time to the time required in the past, to decode the marker. Based on such a comparison, the server may be configured to predict an imminent failure in the zone, when the amount of time required to decode the marker is, for instance, a certain predetermined percentage (e.g., 30%) greater than the prior recorded time which is stored in the database. Upon predicting an imminent failure in a particular zone, the server may be configured to initiate a maintenance operation e.g., an operation to clean the marker(s).

By one embodiment, the server may be configured to perform the functions of auditing inventory items of the warehouse in an efficient manner by exploiting the zonal architecture of the warehouse. Typically, in order to implement functions such as auditing inventory items of the warehouse, re-shuffling inventory items from one location in the warehouse to another location in the warehouse, all other operations in the warehouse are stopped. In doing so, the warehouse incurs downtime that degrades throughput.

By one embodiment of the present disclosure, the server is configured to initiate the inventory auditing function in a zone of the warehouse, which is determined to be substantially idle. For example, if the server anticipates a particular zone in the warehouse to be idle for a certain period of time in the future, the server can schedule an inventory auditing function in that period of time. For example, the server may schedule personnel and/or transportation vehicles in the zone to carry out the inventory auditing functions. It must be appreciated that while the inventory auditing function is being performed in a particular zone of the warehouse, operations in other zones of the warehouse can be performed without interruptions (i.e., without stopping the functions in the other zones).

In a similar manner, items from one zone of the warehouse may be scheduled to be transported to another zone in the warehouse (i.e. reshuffling of items from one zone to another) based on, for instance, the server determining a low of traffic (i.e., deployed transportation vehicles) in the zones where the reshuffling of items is to be performed.

Each of the functions of the described embodiments may be implemented by one or more processing circuits. A processing circuit includes a programmed processor (for example, processor 603 in FIG. 6), as a processor includes circuitry. A processing circuit also includes devices such as an application-specific integrated circuit (ASIC) and circuit components that are arranged to perform the recited functions.

Figure 6:
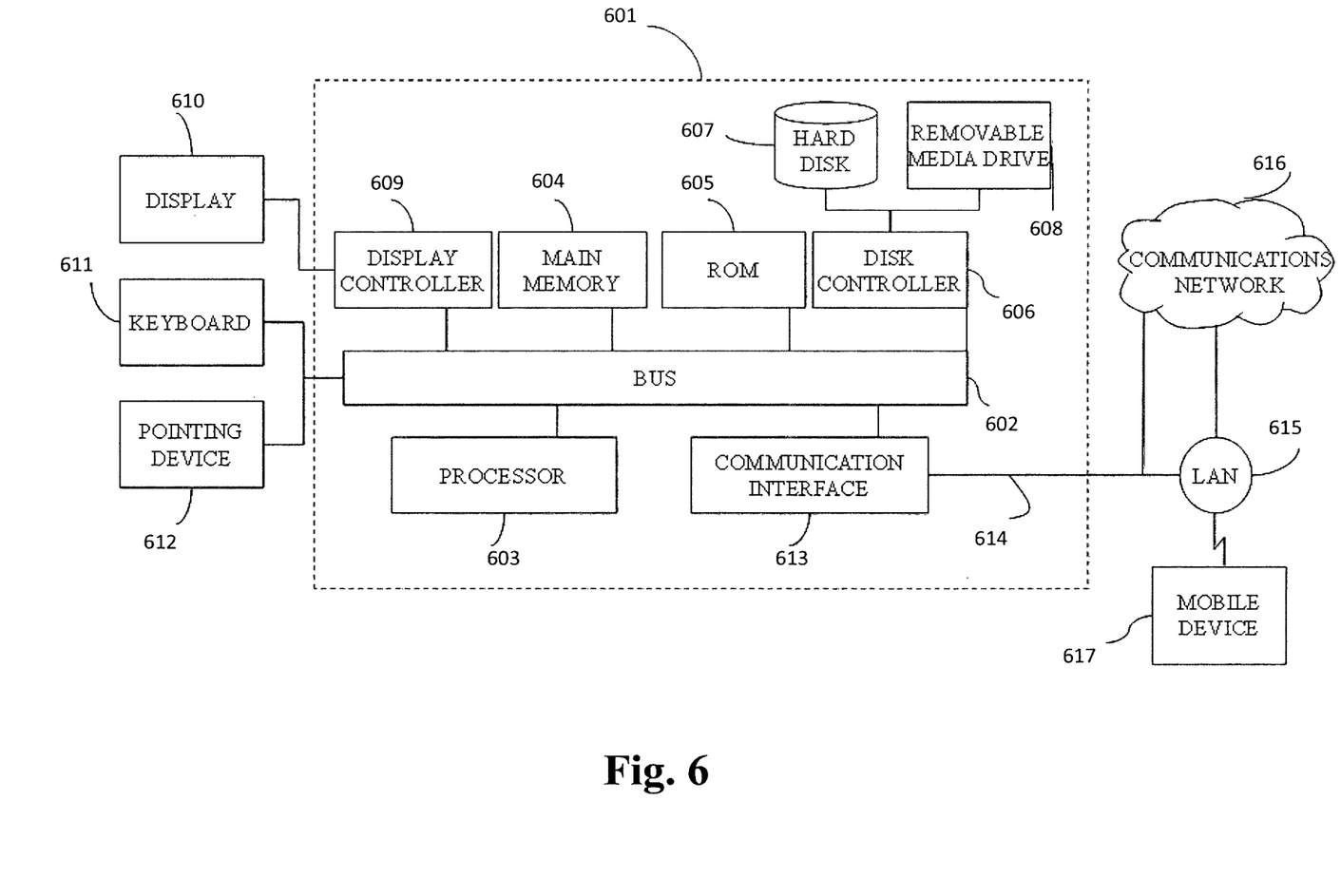
FIG. 6 illustrates a block diagram of a computing device according to one embodiment.

The various features discussed above may be implemented by a computer system (or programmable logic). FIG. 6 illustrates such a computer system 601. In one embodiment, the computer system 601 is a particular, special-purpose machine when the processor 603 is programmed to perform navigational processes of the vehicle, computing compensation path, and other functions described above.

The computer system 601 includes a disk controller 606 coupled to the bus 602 to control one or more storage devices for storing information and instructions, such as a magnetic hard disk 607, and a removable media drive 608 (e.g., floppy disk drive, read-only compact disc drive, read/write compact disc drive, compact disc jukebox, tape drive, and removable magneto-optical drive). The storage devices may be added to the computer system 601 using an appropriate device interface (e.g., small computer system interface (SCSI), integrated device electronics (IDE), enhanced-IDE (E-IDE), direct memory access (DMA), or ultra-DMA).

The computer system 601 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 601 may also include a display controller 609 coupled to the bus 602 to control a display 610, for displaying information to a computer user. The computer system includes input devices, such as a keyboard 611 and a pointing device 612, for interacting with a computer user and providing information to the processor 603. The pointing device 612, for example, may be a mouse, a trackball, a finger for a touch screen sensor, or a pointing stick for communicating direction information and command selections to the processor 603 and for controlling cursor movement on the display 610.

The processor 603 executes one or more sequences of one or more instructions contained in a memory, such as the main memory 604. Such instructions may be read into the main memory 604 from another computer readable medium, such as a hard disk 607 or a removable media drive 608. One or more processors in a multi-processing arrangement may also be employed to execute the sequences of instructions contained in main memory 604. In alternative embodiments, hard-wired circuitry may be used in place of or in combination with software instructions. Thus, embodiments are not limited to any specific combination of hardware circuitry and software.

As stated above, the computer system 601 includes at least one computer readable medium or memory for holding instructions programmed according to any of the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 601, for driving a device or devices for implementing the features of the present disclosure, and for enabling the computer system 601 to interact with a human user. Such software may include, but is not limited to, device drivers, operating systems, and applications software. Such computer readable media further includes the computer program product of the present disclosure for performing all or a portion (if processing is distributed) of the processing performed in implementing any portion of the present disclosure.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 603 for execution. A computer readable medium may take many forms, including but not limited to, non-volatile media or volatile media. Non-volatile media includes, for example, optical, magnetic disks, and magneto-optical disks, such as the hard disk 607 or the removable media drive 608. Volatile media includes dynamic memory, such as the main memory 604. Transmission media, on the contrary, includes coaxial cables, copper wire and fiber optics, including the wires that make up the bus 602. Transmission media also may also take the form of acoustic or light waves, such as those generated during radio wave and infrared data communications.

Various forms of computer readable media may be involved in carrying out one or more sequences of one or more instructions to processor 603 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 601 may receive the data on the telephone line and place the data on the bus 602. The bus 602 carries the data to the main memory 604, from which the processor 603 retrieves and executes the instructions. The instructions received by the main memory 604 may optionally be stored on storage device 607 or 608 either before or after execution by processor 603.

The computer system 601 also includes a communication interface 613 coupled to the bus 602. The communication interface 613 provides a two-way data communication coupling to a network link 614 that is connected to, for example, a local area network (LAN) 615, or to another communications network 610 such as the Internet. For example, the communication interface 613 may be a network interface card to attach to any packet switched LAN. As another example, the communication interface 613 may be an integrated services digital network (ISDN) card. Wireless links may also be implemented. In any such implementation, the communication interface 613 sends and receives electrical, electromagnetic or optical signals that carry digital data streams representing various types of information.

The network link 614 typically provides data communication through one or more networks to other data devices. For example, the network link 614 may provide a connection to another computer through a local network 615 (e.g., a LAN) or through equipment operated by a service provider, which provides communication services through a communications network 610. The local network 614 and the communications network 610 use, for example, electrical, electromagnetic, or optical signals that carry digital data streams, and the associated physical layer (e.g., CAT 5 cable, coaxial cable, optical fiber, etc.). The signals through the various networks and the signals on the network link 614 and through the communication interface 613, which carry the digital data to and from the computer system 601 may be implemented in baseband signals, or carrier wave based signals.

The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 601 can transmit and receive data, including program code, through the network(s) 615 and 610, the network link 614 and the communication interface 613. Moreover, the network link 614 may provide a connection through a LAN 615 to a mobile device 617 such as a personal digital assistant (PDA) laptop computer, or cellular telephone.

While aspects of the present disclosure have been described in conjunction with the specific embodiments thereof that are proposed as examples, alternatives, modifications, and variations to the examples may be made. It should be noted that, as used in the specification and the appended claims, the singular forms "a," "an," and "the" include plural referents unless the context clearly dictates otherwise.

Furthermore, the foregoing discussion discloses and describes merely exemplary embodiments of the present invention. As will be understood by those skilled in the art, the present disclosure may be embodied in other specific forms without departing from the spirit or essential characteristics thereof. Accordingly, the present disclosure is intended to be illustrative and not limiting of the scope, as well as the claims. The disclosure, including any readily discernible variants of the teachings herein, defines in part, the scope of the foregoing claim terminology such that no subject matter is dedicated to the public. Additionally, the above disclosure also encompasses the embodiments listed below:

(1) An apparatus comprising: circuitry configured to partition a workspace into a plurality of zones based on an area of the workspace, and a number of inventory holders that are to be deployed in the workspace, a location of each zone within the workspace being determined based on a first reference location, determine for each zone of the plurality of zones, an area of the zone within the workspace, receive a signal indicating occurrence of an event in one of the plurality of zones of the workspace, determine a degree of criticality of the occurred event, the degree of criticality indicating whether workspace operation in the zone can be continued, and initiate an operation at a timing that is based on the determined degree of criticality, wherein initiation of the operation in the one of the plurality of zones does not affect workspace operation in at least one other zone of the workspace.

(2) The apparatus according to (1), wherein the circuitry is further configured to determine the location of each zone in the workspace based on a second reference location.

(3) The apparatus according to (2), wherein the first reference location and the second reference location correspond to locations of a first type of station and a second type of station, respectively, the first station and the second station being disposed outside the workspace.

(4) The apparatus according to (3), wherein the first station is an item processing station where orders of a warehouse are completed, and the second station is a dispatch station where orders are shipped from the warehouse.

(5) The apparatus according to any one of (1) to (4), wherein the circuitry is further configured to determine the location of a zone of the plurality of zones based on a type of equipment being housed in the zone.

(6) The apparatus according to any one of (1) to (4), wherein the circuitry is configured to determine the location of a zone of the plurality of zones based on a temperature that the zone is expected to be maintained at.

(7) The apparatus according to any one of (1) to (6), wherein the circuitry is configured to determine an area of the zone based on a popularity of items that are to be stored in the zone.

(8) The apparatus according to any one of (1) to (7), wherein each zone of the plurality of zones is separated from its adjacent zones by a marker affixed on the floor of the workspace.

(9) The apparatus according to (1), wherein the event corresponds to one of an object being displaced on a floor of the zone, and a spilled material being detected by a transportation device.

(10) The apparatus according to (1), wherein the circuitry is further configured to partition the workspace based on a number of transportation devices that are to be deployed in the workspace.

(11) The apparatus according to (1), wherein the circuitry is configured to operate each zone of the plurality of zones in one of a first mode of operation and a second mode of operation.

(12) The apparatus according to (11), wherein in the first mode of operation of a zone of the plurality of zones, transportation devices are restricted from entering/exiting the zone by traversing over markers that demarcate the zone from adjacent zones.

(13) The apparatus according to (11), wherein in the second mode of operation of a zone of the plurality of zones, transportation devices are not restricted from entering/exiting the zone by traversing over markers that demarcate the zone from adjacent zones.

(14) The apparatus according to any one of (11) to (13), wherein based on the zone being operated in the second mode of operation, at least one adjacent zone is operating in the second mode.

(15) The apparatus according to (1), wherein each zone includes a visual indicator disposed at an edge of the zone, and the circuitry is configured to control the visual indicator based on an operational state of the zone.

(16) The apparatus according to (1), wherein the circuitry is further configured to display a map including the partitioned workspace on a display panel, and create a blinking effect on a display of the one of the plurality of zones based on the event being detected in the zone.

(17) The apparatus according to (1), wherein the circuitry is further configured to dynamically modify boundaries of a zone of the plurality of zones.

(18) The apparatus of (1), wherein the received signal is transmitted by a transportation device that is operating in one of the plurality of zones of the workspace.

(19) The apparatus of (1), wherein the initiated operation is one of a maintenance operation, an audit operation, an upgrade operation, and a safety operation.

(20) A method comprising: partitioning a workspace into a plurality of zones based on an area of the workspace, and a number of inventory holders that are to be deployed in the workspace, a location of each zone within the workspace being determined based on a first reference location, determining for each zone of the plurality of zones, an area of the zone within the workspace, receiving a signal indicating occurrence of an event in one of the plurality of zones of the workspace, determining a degree of criticality of the occurred event, the degree of criticality indicating whether workspace operation in the zone can be continued, and initiating an operation at a timing that is based on the determined degree of criticality, wherein initiation of the operation in the one of the plurality of zones does not affect workspace operation in at least one other zone of the workspace.

(21) The method of (20), further comprising: determining by circuitry, the location of each zone in the workspace based on a second reference location.

(22) The method according to (21), wherein the first reference location and the second reference location correspond to locations of a first type of station and a second type of station, respectively, the first station and the second station being disposed outside the workspace.

(23) The method according to (22), wherein the first station is an item processing station where orders of a warehouse are completed, and the second station is a dispatch station where orders are shipped from the warehouse.

(24) The method according to any one of (20) to (23), further comprising: determining the location of a zone of the plurality of zones based on a type of equipment being housed in the zone.

(25) The method according to any one of (20) to (23), further comprising: determining the location of a zone of the plurality of zones based on a temperature that the zone is expected to be maintained at.

(26) The method according to any one of (20) to (25), further comprising: determining an area of the zone based on a popularity of items that are to be stored in the zone.

(27) The method according to any one of (20) to (26), wherein each zone of the plurality of zones is separated from its adjacent zones by a marker affixed on the floor of the workspace.

(28) The method according to (20), wherein the event corresponds to one of an object being displaced on a floor of the zone, and a spilled material being detected by a transportation device.

(29) The method according to (20), further comprising: partitioning the workspace based on a number of transportation devices that are to be deployed in the workspace.

(30) The method according to (20), further comprising: operating each zone of the plurality of zones in one of a first mode of operation and a second mode of operation.

(31) The method according to (30), wherein in the first mode of operation of a zone of the plurality of zones, transportation devices are restricted from entering/exiting the zone by traversing over markers that demarcate the zone from adjacent zones.

(32) The method according to (30), wherein in the second mode of operation of a zone of the plurality of zones, transportation devices are not restricted from entering/exiting the zone by traversing over markers that demarcate the zone from adjacent zones.

(33) The method according to any one of (30) to (32), wherein based on the zone being operated in the second mode of operation, at least one adjacent zone is operating in the second mode.

(34) The method according to (20), wherein each zone includes a visual indicator disposed at an edge of the zone, and the circuitry is configured to control the visual indicator based on an operational state of the zone.

(35) The method according to (20), further comprising: displaying a map including the partitioned workspace on a display panel, and creating a blinking effect on a display of the one of the plurality of zones based on the event being detected in the zone.

(36) The method according to (20), further comprising: modifying dynamically, boundaries of a zone of the plurality of zones.

(37) The method of (20), wherein the received signal is transmitted by a transportation device that is operating in one of the plurality of zones of the workspace.

(38) The method of (20), wherein the initiated operation is one of a maintenance operation, an audit operation, an upgrade operation, and a safety operation.

(39) A non-transitory computer readable medium having stored thereon a program that when executed by a computer causes the computer to execute a method comprising: partitioning a workspace into a plurality of zones based on an area of the workspace, and a number of inventory holders that are to be deployed in the workspace, a location of each zone within the workspace being determined based on a first reference location, determining for each zone of the plurality of zones, an area of the zone within the workspace, receiving a signal indicating occurrence of an event in one of the plurality of zones of the workspace, determining a degree of criticality of the occurred event, the degree of criticality indicating whether workspace operation in the zone can be continued, and initiating an operation at a timing that is based on the determined degree of criticality, wherein initiation of the operation in the one of the plurality of zones does not affect workspace operation in at least one other zone of the workspace.

(40) The non-transitory computer readable medium of (39), the method further comprising: determining by circuitry, the location of each zone in the workspace based on a second reference location.

(41) The non-transitory computer readable medium according to (40), wherein the first reference location and the second reference location correspond to locations of a first type of station and a second type of station, respectively, the first station and the second station being disposed outside the workspace.

(42) The non-transitory computer readable medium according to (41), wherein the first station is an item processing station where orders of a warehouse are completed, and the second station is a dispatch station where orders are shipped from the warehouse.

(43) The non-transitory computer readable medium according to any one of (39) to (42), the method further comprising: determining the location of a zone of the plurality of zones based on a type of equipment being housed in the zone.

(44) The non-transitory computer readable medium according to any one of (39) to (42), the method further comprising: determining the location of a zone of the plurality of zones based on a temperature that the zone is expected to be maintained at.

(45) The non-transitory computer readable medium according to any one of (39) to (44), the method further comprising: determining an area of the zone based on a popularity of items that are to be stored in the zone.

(46) The non-transitory computer readable medium according to any one of (39) to (45), wherein each zone of the plurality of zones is separated from its adjacent zones by a marker affixed on the floor of the workspace.

(47) The non-transitory computer readable medium according to (39), wherein the event corresponds to one of an object being displaced on a floor of the zone, and a spilled material being detected by a transportation device.

(48) The non-transitory computer readable medium according to (39), the method further comprising: partitioning the workspace based on a number of transportation devices that are to be deployed in the workspace.

(49) The non-transitory computer readable medium according to (39), the method further comprising: operating each zone of the plurality of zones in one of a first mode of operation and a second mode of operation.

(50) The non-transitory computer readable medium according to (49), wherein in the first mode of operation of a zone of the plurality of zones, transportation devices are restricted from entering/exiting the zone by traversing over markers that demarcate the zone from adjacent zones.

(51) The non-transitory computer readable medium according to (49), wherein in the second mode of operation of a zone of the plurality of zones, transportation devices are not restricted from entering/exiting the zone by traversing over markers that demarcate the zone from adjacent zones.

(52) The non-transitory computer readable medium according to any one of (49) to (51), wherein based on the zone being operated in the second mode of operation, at least one adjacent zone is operating in the second mode.

(53) The non-transitory computer readable medium according to (39), wherein each zone includes a visual indicator disposed at an edge of the zone, and the circuitry is configured to control the visual indicator based on an operational state of the zone.

(54) The non-transitory computer readable medium according to (39), the method further comprising: displaying a map including the partitioned workspace on a display panel, and creating a blinking effect on a display of the one of the plurality of zones based on the event being detected in the zone.

(55) The non-transitory computer readable medium according to (39), the method further comprising: modifying dynamically, boundaries of a zone of the plurality of zones.

(56) The non-transitory computer readable medium of (39), wherein the received signal is transmitted by a transportation device that is operating in one of the plurality of zones of the workspace.

(57) The non-transitory computer readable medium of (39), wherein the initiated operation is one of a maintenance operation, an audit operation, an upgrade operation, and a safety operation.

The invention claimed is:

1. An apparatus comprising:
   circuitry configured to
      partition a workspace into a plurality of contiguous zones, each of the plurality of contiguous zones including an independent entry and exit area located at a periphery of the workspace,
      receive, from monitoring equipment located in the workspace, information indicating occurrence of an event in one of the plurality of contiguous zones of the workspace while a mode of the one of the plurality of contiguous zones is set to a restricted mode in which operation of one or more transport devices within the one of the plurality of contiguous zones is permitted and entry of any personnel within the one of the plurality of contiguous zones is restricted,
      determine a degree of criticality of the occurred event, the degree of criticality indicating whether the one or more transport devices are permitted to continue operating within the one of the plurality of contiguous zones,
      change the mode of the one of the plurality of contiguous zones to one of a plurality of types of modes depending upon the criticality of the event determined, and
      transmit navigational instructions to the one or more transport devices based on the change of the mode of the one of the plurality of contiguous zones.

2. The apparatus according to claim 1, wherein each of the plurality of contiguous zones can be subdivided into smaller areas individually operable as zones.

3. The apparatus according to claim 1, wherein the event corresponds to one of an object being displaced on a floor of the one of the plurality of contiguous zones, and a spilled material being detected by one of the one or more transportation devices.

4. The apparatus according to claim 1, wherein the circuitry is further configured to partition the workspace based on a number of transportation devices that are to be deployed in the workspace.

5. The apparatus according to claim 1, wherein
   the circuitry is configured to operate each of the plurality of contiguous zones in one of a first mode of operation and a second mode of operation,
   in the first mode of operation, transportation devices are restricted from entering and exiting the plurality of contiguous zones by traversing over markers that demarcate the plurality of contiguous zones, and
   in the second mode of operation, the one or more transportation device are not restricted from entering and exiting the plurality of contiguous zones by traversing over the markers that demarcate the plurality of zone.

6. The apparatus according to claim 1, wherein each of the plurality of contiguous zones includes a visual indicator disposed at an edge of the respective zone, and the circuitry is configured to control the visual indicator based on whether the respective zone is set to the restricted mode or an unrestricted mode.

7. The apparatus according to claim 1, wherein the circuitry is further configured to dynamically modify boundaries of the one of the plurality of contiguous zones.

8. The apparatus of claim 1, wherein the plurality of modes includes (i) complete restriction of movement of bots inside the zone and (ii) partial restriction with respect to a certain bots inside the zone or a task specific action for the bots inside the zone which also can have limited access to operators inside the zone.

9. A method comprising:
   partitioning a workspace into a plurality of contiguous zones, each of the plurality of contiguous zones including an independent entry and exit area located at a periphery of the workspace,
   receiving, from monitoring equipment located in the workspace, information indicating occurrence of an event in one of the plurality of contiguous zones of the workspace while a mode of the one of the plurality of contiguous zones is set to a restricted mode in which operation of one or more transport devices within the one of the plurality of contiguous zones is permitted and entry of any personnel within the one of the plurality of contiguous zones is restricted,
   determining a degree of criticality of the occurred event, the degree of criticality indicating whether the one or more transport devices are permitted to continue operating within the one of the plurality of contiguous zones, changing the mode of the one of the plurality of contiguous zones to one of a plurality of types of modes depending upon the criticality of the event determined, and transmitting navigational instructions to the one or more transport devices based on the changing of the mode of the one of the plurality of contiguous zones.

10. The method according to claim 9, wherein each of the plurality of contiguous zones can be subdivided in to smaller areas individually operable as zones.

11. The method according to claim 9, wherein the event corresponds to one of an object being displaced on a floor of the one of the plurality of contiguous zones, and a spilled material being detected by one of the one or more transportation devices.

12. The method according to claim 9, further comprising:
partitioning the workspace based on a number of transportation devices that are to be deployed in the workspace.

13. The method according to claim 9, further comprising:
operating each of the plurality of contiguous zones in one of a first mode of operation and a second mode of operation, wherein
in the first mode of operation, transportation devices are restricted from entering and exiting the plurality of contiguous zones by traversing over markers that demarcate the plurality of contiguous zones, and
in the second mode of operation, the one or more transportation device are not restricted from entering and exiting the plurality of contiguous zones by traversing over the markers that demarcate the plurality of contiguous zones.

14. The method according to claim 9, wherein
each of the plurality of contiguous zones includes a visual indicator disposed at an edge of the respective zone, and the method further includes
controlling the visual indicator based on whether the respective zone is set to the restricted mode or an unrestricted mode.

15. The method according to claim 9, further comprising:
modifying dynamically, boundaries of the one of the plurality of contiguous zones.

16. The method of claim 9, wherein the plurality of modes includes (i) complete restriction of movement of bots inside the zone and (ii) partial restriction with respect to a certain bots inside the zone or a task specific action for the bots inside the zone which also can have limited access to operators inside the zone.

17. A non-transitory computer readable medium having stored thereon a program that when executed by a computer causes the computer to execute a method comprising:
partitioning a workspace into a plurality of contiguous zones, each of the plurality of contiguous zones including an independent entry and exit area located at a periphery of the workspace,
receiving, from monitoring equipment located in the workspace, information indicating occurrence of an event in one of the plurality of contiguous zones of the workspace while a mode of the one of the plurality of contiguous zones is set to a restricted mode in which operation of the one or more transport devices within the one of the plurality of contiguous zones is permitted and entry of any personnel within the one of the plurality of contiguous zones is restricted, determining a degree of criticality of the occurred event, the degree of criticality indicating whether the one or more transport devices are permitted to continue operating within the one of the plurality of contiguous zones, and changing the mode of the one of the plurality of contiguous zones to one of a plurality of types of modes depending upon the criticality of the event determined, and transmitting navigational instructions to the one or more transport devices based on the changing of the mode of the one of the plurality of contiguous zones.

18. The non-transitory computer readable medium according to claim 17, wherein each of the plurality of contiguous zones can be subdivided into smaller areas individually operable as zones.

19. The non-transitory computer readable medium according to claim 17, wherein the event corresponds to one of an object being displaced on a floor of the one of the plurality of contiguous zones, and a spilled material being detected by one of the one or more transportation devices.

20. The non-transitory computer readable medium according to claim 17, the method further comprising:
partitioning the workspace based on a number of transportation devices that are to be deployed in the workspace.

21. The non-transitory computer readable medium according to claim 17, the method further comprising:
operating each of the plurality of contiguous zones in one of a first mode of operation and a second mode of operation, wherein in the first mode of operation, transportation devices are restricted from entering and exiting the plurality of contiguous zones by traversing over markers that demarcate the plurality of contiguous zones, and
in the second mode of operation, the one or more transportation device are not restricted from entering and exiting the plurality of contiguous zones by traversing over the markers that demarcate the plurality of contiguous zones.

22. The non-transitory computer readable medium according to claim 17, wherein
each of the plurality of contiguous zones includes a visual indicator disposed at an edge of the respective zone, and the method further includes
controlling the visual indicator based on whether the respective zone is set to the restricted mode or an unrestricted mode.

23. The non-transitory computer readable medium according to claim 17, the method further comprising:
modifying dynamically, boundaries of the one of the plurality of contiguous zones.

24. The non-transitory computer readable medium of claim 17, wherein the plurality of modes includes (i) complete restriction of movement of bots inside the zone and (ii) partial restriction with respect to a certain bots inside the zone or a task specific action for the bots inside the zone which also can have limited access to operators inside the zone.

25. The apparatus according to claim 1, wherein the monitoring equipment includes at least one of (i) a sensor of the one or more transport devices, and (ii) one or more cameras located in the workspace.

* * * * *